Patented July 25, 1950

2,516,830

UNITED STATES PATENT OFFICE 2,516,830

FLUORINATED NICOTINIC COMPOUNDS

Arthur S. Roe, Chapel Hill, N. C., assignor to Eli Lilly and Company, Indianapolis, Ind., a corporation of Indiana No Drawing. Application February 7, 1949,
Serial No. 75,077

6 Claims. (Cl. 260—295.5)

This invention relates to novel organic compounds and more particularly to fluorinated organic compounds and their salts.

The bases of compounds of the present invention may be represented by the following formula

wherein X is a carboxyl (—COOH) or a carboxyamide (—CONH₂) group. As will be seen from the above formula, the bases of the compounds of this invention are 5-fluoronicotinic acid and 5-fluoronicotinamide.

Also included within the scope of this invention are the salts of the above-described compounds, which salts are acid addition salts of 5-fluoronicotinic and 5-fluoronicotinamide and the metallic salts of 5-fluoronicotinic acid. Illustrative examples of acid addition salts are the hydrochloride, hydrobromide, sulfate, nitrate and phosphate salts of 5-fluoronicotinic acid and 5-fluoronicotinamide. The acid salts of this invention may be represented by the formula

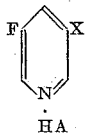

wherein X has the same significance as above, and HA represents an acid. Illustrative examples of the metallic salts of 5-fluoronicotinic acid are the sodium, potassium, ammonium, substituted ammonium, calcium and magnesium salts. The metallic salts of 5-fluoronicotinic acid may be represented by the formula

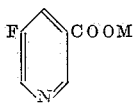

wherein M represents a metallic radical.

The compounds of this invention are effective antimetabolites and are useful in combating bacterial infections such as streptococcic and staphylococcic infections and the like.

The following specific examples illustrate preferred methods of preparing the novel compounds.

EXAMPLE 1

*Preparation of 5-fluoronicotinic acid*

5-fluoronicotinic acid is prepared by the several procedural steps described below:

A solution of 50 g. of 2-amino-3-methylpyridine in 240 ml. of concentrated sulfuric acid is cooled to about 5° C. To the solution, which is maintained below about 10° C., is added slowly and with stirring, a mixture of about 35 ml. of concentrated sulfuric acid and 35 ml. of concentrated nitric acid. The mixture is allowed to warm to room temperature and to stand for about 10 hours. To the mixture are added about 35 ml. of concentrated nitric acid, the acid being added at such a rate as to maintain the temperature at about 40° C. After the nitric acid has been added about 50 ml. of the reaction mixture are poured into about 100 ml. of water and the aqueous mixture is heated to about 120° C. When the evolution of the gas has ceased, the remainder of the reaction mixture is added in portions to the heated aqueous mixture. After gas evolution has ceased, the aqueous mixture is rapidly cooled by placing the mixture in an ice-bath and by adding ice directly to the mixture, whereupon 2-hydroxy-3-methyl-5-nitropyridine precipitates as a finely-divided solid. The solid is filtered off and from the filtrate an additional amount of 2-hydroxy-3-methyl-5-nitropyridine is obtained by neutralizing the filtrate and filtering off the 2-hydroxy-3-methyl-5-nitropyridine which separates.

83 g. of 2-hydroxy-3-methyl-5-nitropyridine are treated with 400 ml. of phosphorous oxychloride and the mixture is refluxed for about 6 hours. The excess phosphorous oxychloride is distilled off and the residue is poured into a mixture of ice and water. 2-chloro-3-methyl-5-nitropyridine separates as a solid and is filtered off. The aqueous filtrate is neutralized with sodium hydroxide solution and extracted twice with 100 ml. portions of ether to extract from the filtrate the small amount of 2-chloro-3-methyl-5-nitropyridine dissolved therein. The 2-chloro-3-methyl-5-nitropyridine first obtained by the filtration, is dissolved in the combined ether extracts and the small amount of heavy dark liquid which settles out is separated and discarded. The ether solution of 2-chloro-3-methyl-5-nitropyridine is dried over calcium oxide, the ether is evaporated off and the residue comprising the 2-chloro-3-methyl-5-nitropyridine is purified by distillation. The 2-chloro-3-methyl-5-nitropyridine boils at about 145.5° C. at about 18 mm. pressure. On standing, it crystallizes, forming a pale yellow solid which melts at 47–48° C.

To a solution of 24 g. of 2-chloro-3-methyl-5-nitropyridine in 100 ml. of glacial acetic acid are added 14 g. of anhydrous sodium acetate and 5 g. of palladium charcoal catalyst. The mixture is shaken in an atmosphere of hydrogen at 15 to 25 pounds pressure. After about 70 percent of the theoretical amount of hydrogen has been taken up by the nitropyridine compound, the mixture is heated with an infrared lamp until further uptake of hydrogen ceases. The reaction mixture is filtered to remove the catalyst and evaporated to dryness. The residue, which contains 3-methyl-5-aminopyridine, is made strongly basic with concentrated sodium hydroxide solution and heated for 30 minutes. The alkaline mixture is cooled and extracted with three 75 ml. portions of ether. The combined ether extracts are dried over sodium hydroxide and the ether evaporated. The residue, comprising 3-methyl-5-aminopyridine, is purified by distillation. 3-methyl-5-aminopyridine boils at about 153° C. at about 21 mm. pressure. It crystallizes on standing and after crystallization melts at about 57-59° C.

A solution of 12 g. of 3-methyl-5-aminopyridine in a mixture of 50 ml., of 42 percent fluoboric acid and 75 ml. of ethanol is cooled to about −10° C. While stirring and maintaining the solution below about −5° C., ethyl nitrite is passed into the mixture. After about 20 minutes a precipitate of the diazonium fluoborate salt of 3-methyl-5-aminopyridine separates. Addition of ethyl nitrite is continued until no additional precipitate is formed. The reaction mixture is poured into a cold (−70° C.) solution of 75 ml. of absolute alcohol and 100 ml. of ethyl ether. The mixture is filtered and the white precipitate comprising the diazonium fluoborate salt is washed twice with cold ethanol, twice with dry cold ether and twice with dry low-boiling petroleum ether. Care must be taken not to allow the solid to become free of solvent since the solid is unstable if all solvent is removed. The solid on the filter which is kept moist with petroleum ether, is transferred to a flask containing about 75 ml. of dry petroleum ether and the mixture is warmed gently under a reflux condenser to initiate the decomposition of the diazonium salt. The decomposition of the salt is controlled by applying cooling means as necessary to prevent too vigorous a decomposition. After the decomposition is complete the mixture is refluxed for about 30 minutes during which time the diazonium salt is completely decomposed and converted to the fluoborate salt of 3-methyl-5-fluoropyridine which is a solid. The petroleum ether is decanted from the solid and the ether is extracted twice with 50 ml. portions of dilute hydrochloric acid. The already-separated solid is dissolved in the combined hydrochloric acid extracts and the solution is heated until all of the petroleum ether is evaporated. The acid solution is made slightly alkaline, the mixture is steam-distilled and the 3-methyl-5-fluoropyridine which distills with the steam appears as an oily layer in the distillate. The distillate is saturated with sodium sulfate and made alkaline with a few drops of sodium hydroxide and the organic layer comprising the 3-methyl-5-fluoropyridine is separated and purified by distillation. 3-methyl-5-fluoropyridine boils at about 139° C. at 700 mm. pressure.

To a refluxing mixture of 8.5 g. of 3-methyl-5-fluoropyridine and 600 ml. of water, 26 g. of potassium permanganate are added in portions over a period of about 3 hours. The reaction mixture is steam-distilled to remove unreacted 3-methyl-5-fluoropyridine and the undistilled aqueous residue containing 5-fluoronicotinic acid as its potassium salt is filtered while hot to remove the precipitated manganese dioxide. The filtrate which contains the 5-fluoronicotinic acid as its potassium salt is evaporated to a volume of about 150 ml., and hydrochloric acid is added slowly until precipitation of the 5-fluoronicotinic acid is complete. The 5-fluoronicotinic acid is filtered off, and the filtrate is evaporated to a volume of about 50 ml. and an additional amount of hydrochloric acid is added whereupon a further quantity of 5-fluoronicotinic acid is obtained. The portions of 5-fluoronicotinic acid are combined, and purified by recrystallization from water.

5-fluoronicotinic acid thus obtained was a white, crystalline compound which melted at about 195–197° C. Analysis showed the presence of about 10.05 nitrogen as compared with the calculated value of 9.93 percent.

EXAMPLE 2

*Preparation of 5-fluoronicotinic acid hydrochloride*

2 g. of 5-fluoronicotinic acid are dissolved in about 5 ml. of dry ethanol and 5 ml. of a dry ethanol solution of hydrogen chloride are added. The mixture is treated with an excess of absolute ether whereupon 5-fluoronicotinic acid hydrochloride separates as a white solid and is recovered by filtration. It is purified by recrystallization from a mixture of absolute methanol and ethyl acetate.

Other acid addition salts are prepared by substantially the same procedure.

EXAMPLE 3

*Preparation of 5-fluoronicotinamide*

3 g. of 5-fluoronicotinic acid are dissolved in 50 ml. of thionyl chloride and the solution is refluxed for about 12 hours. The excess thionyl chloride is removed by evaporation at reduced pressure and the residue comprising 5-fluoronicotinyl chloride is purified by distillation in vacuo. 5-fluoronicotinyl chloride boils at about 82° C. at 18 mm. pressure.

1.5 ml. of 5-fluoronicotinyl chloride is reacted with anhydrous ammonia by passing dry ammonia gas over the 5-fluoronicotinyl chloride. The 5-fluoronicotinamide which is formed, is purified by recrystallization from water.

5-fluoronicotinamide thus prepared melted at about 173–175° C. Analysis showed the presence of about 20.03 percent nitrogen as compared with the calculated value of 20.0 percent.

EXAMPLE 4

*Preparation of 5-fluoronicotinamide sulfate*

5-fluoronicotinamide sulfate is prepared from 5-fluoronicotinamide and sulfuric acid by substantially the same procedure which is used for the preparation of 5-fluoronicotinic acid hydrochloride described in Example 3.

Other acid addition salts are prepared by substantially the same procedure.

EXAMPLE 5

The sodium salt of 5-fluoronicotinic acid is obtained by treating an aqueous suspension of 5-fluoronicotinic acid with an aqueous solution containing an equivalent amount of sodium hydroxide, and evaporating the resulting solution to dryness, yielding the sodium salt as a white crystalline compound.

Other metal salts are prepared in a similar manner. The ammonium salt of 5-fluoronicotinic acid is prepared by adding an excess of concentrated ammonium hydroxide to an aqueous suspension or solution of 5-fluoronicotinic acid and evaporating the resulting solution of the ammonium salt to dryness in vacuo.

What is claimed is:

1. A compound selected from the group consisting of 5-fluoronicotinic acid, alkali and alkaline earth metal salts of 5-fluoronicotinic acid, acid addition salts of 5-fluoronicotinic acid, 5-fluoronicotinamide, and acid addition salts of 5-fluoronicotinamide.

2. 5-fluoronicotinic acid represented by the formula

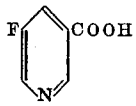

3. 5-fluoronicotinamide represented by the formula

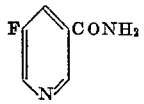

4. A salt of 5-fluoronicotinic acid, having the formula

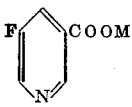

wherein M represents a metallic radical.

5. 5-fluoronicotinamide hydrochloride.
6. 5-fluoronicotinamide sulfate.

ARTHUR S. ROE.

REFERENCES CITED

The following references are of record in the file of this patent:

Graf, Chem. Abstracts, vol. 28, pp. 769 and 770 (1934).

Maier Das Pyridine und Seine derivate, 1934, "Wilhelm Knapp," page 80.